INVENTOR
ARDON Y. KIPNIS

BY

ATTORNEY

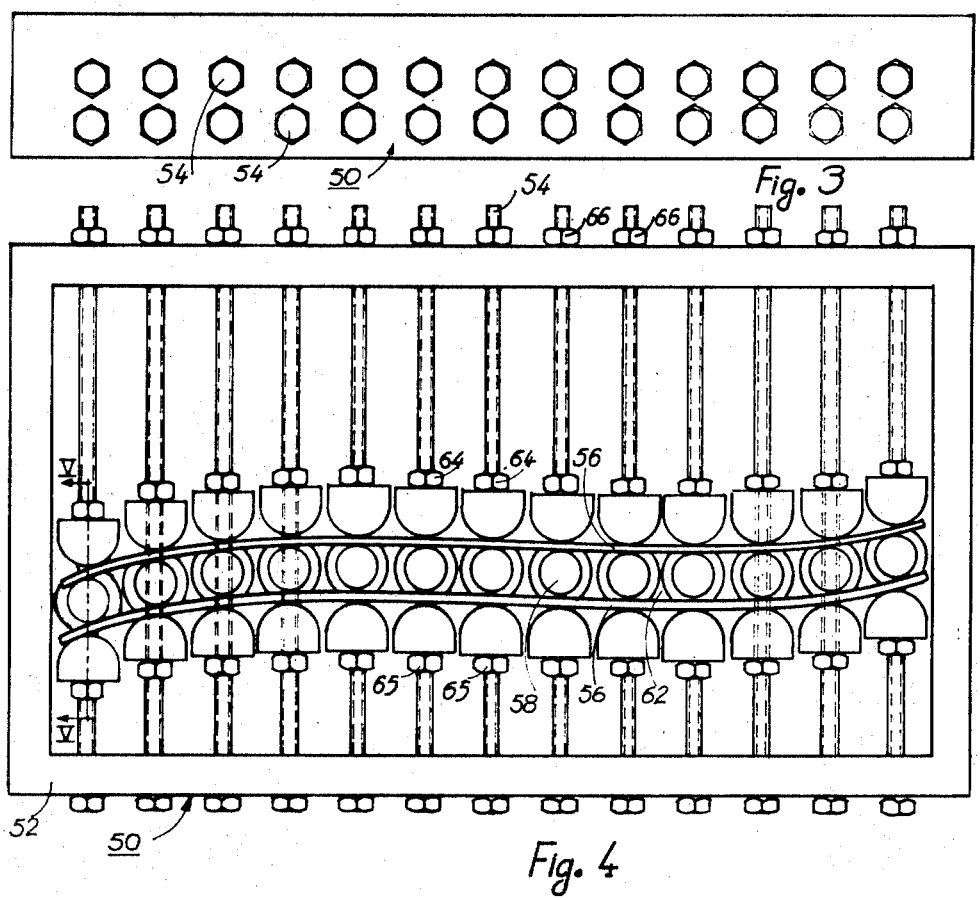
Fig. 3
Fig. 4
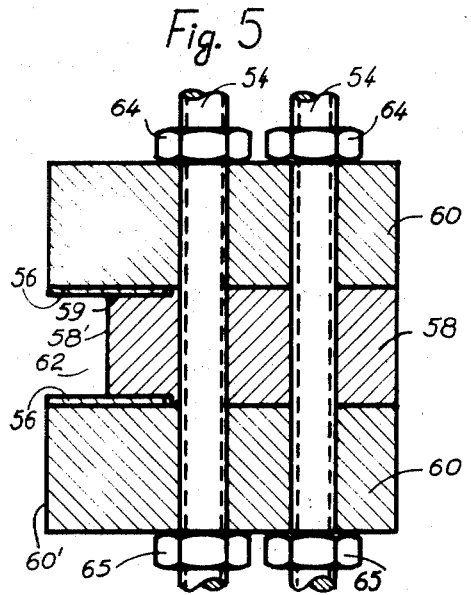
Fig. 5
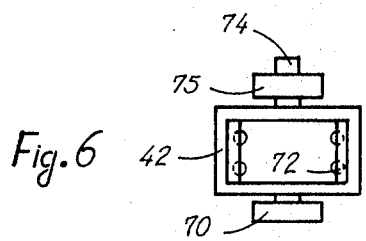
Fig. 6
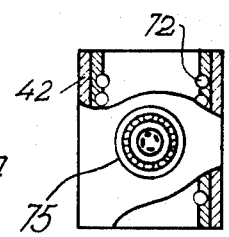
Fig. 7
INVENTOR.
ARDON Y. KIPNIS
BY United States Patent Office 3,516,206
Patented June 23, 1970

3,516,206
CONTINUOUSLY-ADJUSTABLE VARIABLE MECHANISMS AND MACHINE TOOLS INCORPORATING SAME
Ardon Y. Kipnis, 1 Haifa Road, Tel Aviv, Israel
Filed July 17, 1967, Ser. No. 653,801
Claims priority, application Israel, July 18, 1966, 26,170
Int. Cl. B24b 7/02; F16h 53/00
U.S. Cl. 51—46                                    7 Claims

ABSTRACT OF THE DISCLOSURE

A control mechanism for coupling together two moving elements comprises a crank pivotable about a fixed pivot point coupled to one of the elements, a slide slidable along the crank, a link coupled to the other of the elements and pivotably connected to the slide at a pivot point overlying the crank, and a changeable program member having a guide surface of a configuration in accordance with the relative movement desired, the slide including a follower that moves along the guide surface during the movement of the link and displaces the slide along the crank to continuously vary the effective length of the crank in accordance with the configuration of the guide surface. Also described is a machine tool, namely one for producing aspherical lenses, embodying the foregoing control mechanism for controlling the movement of the tool holder with respect to the workpiece holder.

BACKGROUND OF THE INVENTION

Field of the invention

The present invention relates to control mechanisms for coupling together two moving elements for controlling the relative movement of one with respect to the other. The invention also relates to machine tools incorporating such mechanisms.

Description of the prior art

It is frequently required that a tool is to be moved in a complicated manner with respect to a workpiece or vice versa. These relative movements are usually effected through lead screws, racks and pinions, gear trains or like mechanisms driven by a common power source such as an electric motor having gear transmissions between it and the driven devices. Since gear trains do not allow continuous variation in their gear ratios, and since the motions of elements of various mechanisms are related by functions typical to each mechanism, the production of parts having irregular surfaces (e.g. surfaces with varying configuration, such as aspherical lenses, gun barrel bores having grooves with varying pitch, and the like) requires in general other means for generating the desired functions in order to control the relative movements between the tool and the workpiece. At the present time, parts having irregular configurations are usually manufactured manually, by copying templates, or by numerically controlled machines. These procedures are either very expensive or do not lend themselves well to mass production.

SUMMARY OF THE INVENTION

An object of the present invention is to provide mechanisms which may be controlled in a simple and changeable manner so as to generate an infinite number of functions. A further object is to provide machine tools incorporating such mechanisms.

As is known, a small angular displacement of a crank about its axis may be represented by the equation: $\Delta\alpha = \Delta S_T / R$, where $\Delta\alpha$ is a small angle of rotation of the crank, $\Delta S_T$ is a small tangential displacement component of a point on that crank, and R is its distance from the centre of rotation. Thus, by changing R, $\Delta S_T$ or both, it is possible to change $\Delta\alpha$ for a given $\Delta S$, $\Delta S$ being the total displacement (radial and tangential) of that point.

The present invention makes use of the above relationship in order to generate an infinite number of functions, by providing a crank, a slide slideable along the crank, and a program member having a guide surface of a configuration in accordance with the function to be generated. The slide is coupled to the guide surface so that during the movement of the slide, the program member guide surface positions the slide on the crank in accordance with the configuration of the guide surface. Thus, the distance R of the displaced point on the crank from its centre of rotation, and $\Delta S_T$ for a given $\Delta S$, are continuously varied by the program member, enabling the mechanism to generate an infinite number of functions according to the program member.

The novel mechanism may thus be used for producing a part having an irregular shape by employing a program special to that shape, and when a part of a different shape is to be produced, the mechanism may be swiftly adapted for the new shape by changing the program of the program member used, e.g. by substituting a new program member.

Such mechanisms are particularly suited for use in machine tools for producing irregular-shaped parts. Therefore, the invention also provides a machine tool comprising a tool holder and a workpiece holder, at least one of the holders being displaceable in respect to the other, and including a displacing device therefor, and a control mechanism as described above connected between the one holder and its displacing device.

It will be appreciated that the novel mechanism of the present invention actually constitutes a mechanical analogue computer, and therefore it may be used in many other applications where such analogue computer mechanisms are used.

Further features of the invention will be apparent from the description below.

BRIEF DESCRIPTION OF THE DRAWINGS

The invention is herein described with reference to the accompanying drawings which illustrate, by way of example only, one embodiment of the invention. In the drawings:

FIG. 3 is a side elevational view of a program member used in the above mechanism of the machine tool;

FIG. 4 is a top plan view of the program member of FIG. 3;

FIG. 5 is an enlarged transverse sectional view along lines V—V of FIG. 4;

FIG. 6 is an end view of the slide used in the above mechanism; and

FIG. 7 is a plan view, partially in section, of the slide of FIG. 6.

DESCRIPTION OF THE PREFERRED EMBODIMENT

Figure 1:
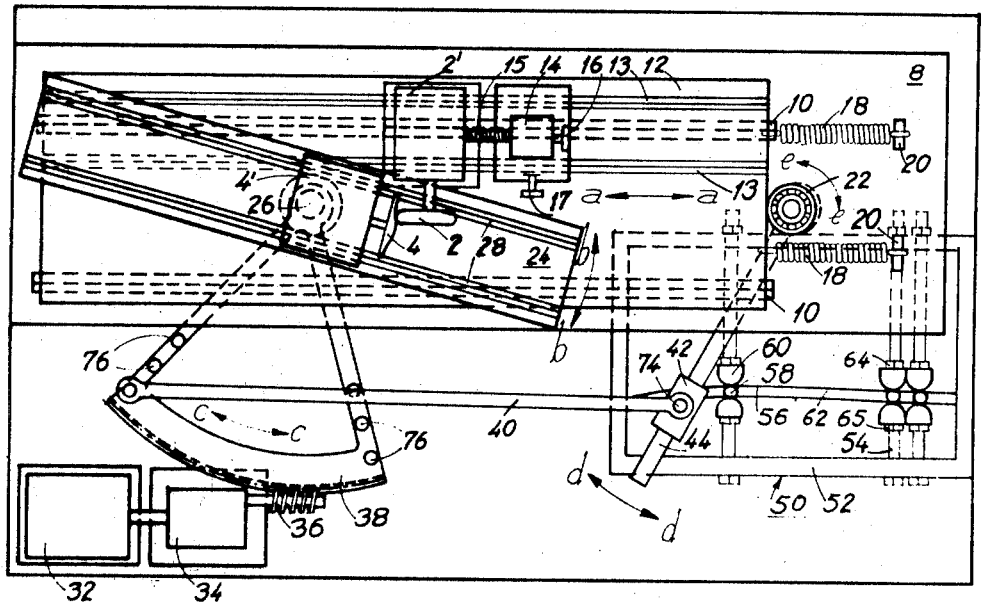
FIG. 1 is a top plan view of a machine tool, particularly for producing aspherical lenses, which machine tool includes a continuously-adjustable, variable mechanism constructed in accordance with the invention for controlling the displacements of the tool holder in respect to the workpiece holder.
Figure 2:
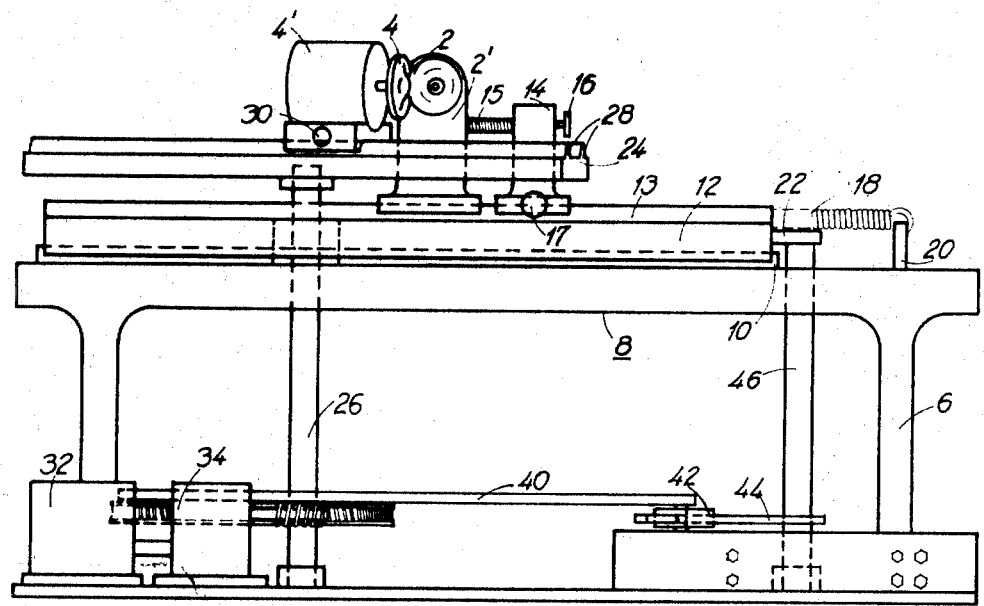
FIG. 2 is a side elevational view of the machine tool of FIG. 1.

FIGS. 1 and 2 illustrate a lens grinder including a continuously-adjustable, variable mechanism in accordance with the invention for controlling the relation between the linear motion in the direction of arrows a—a of the grinder 2 and the angular motion in the direction of arrows b—b of the lens blank 4, in order to produce an aspherical lens. The machine tool of FIGS. 1 and 2 comprises a stand 6 supporting a horizontal bed 8 formed with ways 10 on which is mounted a table 12 for reciprocal movement. Table 12 is formed with ways 13 on its upper surface which receive grinder 2 and its drive 2'. A feeding device 14 is also supported on ways 13, this device including a lead screw 15 secured to the grinder drive 2' and adjustable by a knob 16. The feeding device 14 may be preset to any desired position on the table, as by a locking bolt 17. The grinder 2 is thus also preset in the desired position at the beginning of the grinding operation. A complete grinding operation involves a plurality of strokes, and at the completion of each stroke, knob 16 of feeding device 14 is rotated slightly so as to displace the grinder 2 a slight amount in the direction of the lens blank 4.

Table 12 carrying grinder 2, including its holder and drive 2', is urged in one direction (rightwardly in FIG. 1) by means of a pair of springs 18 fixed at one end to bed 8, as by engaging embossments 20 on the bed, and at the other end to table 12. An eccentrically mounted bearing 22, serving as a cam, bears against the right end of table 12 and is adapted when rotated in the direction e—e to displace the table rightwardly and leftwardly, the table being urged against the cam by springs 18. Rotation of cam 22 will thus cause table 12 and grinder 2 to be displaced in the direction of arrows a—a.

The machine includes a second table 24 carrying the lens blank 4 and its holder and drive 4'. Table 24 is mounted on a rotatable vertical axle 26 above table 12. The upper face of table 24 is formed with ways 28 to permit the setting of lens holder 4', the lens holder being fixed in position by any suitable manner, such as locking bolt 30.

Table 24 is pivoted in the direction of arrows b—b by means of a motor 32 coupled through a speed reducer 34 and worm gear 36 to a worm wheel segment 38. The latter is oscillated in the direction of arrows c—c, and at its center of rotation there is fixed axle 26 supporting table 24. Thus, table 24 and the lens holder 4 will oscillate in the direction of arrows b—b with the oscillation of worm wheel segment 38.

Worm wheel segment 38 is also used for reciprocating table 12 and thereby the grinder 2. For this purpose, a link 40 is connected to a slide 42 slidable along a crank 44 fixed to another rotatable vertical axle 46, at the upper end of which there is fixed the previously mentioned cam 22. Movement of worm wheel segment 38 will thus cause crank 44 to oscillate in the direction of arrows d—d, producing through axle 46 and cam 22 a displacement of table 12 in the direction of arrows a—a.

The displacement of table 12, and thereby of grinder 2, is controlled by the continuously-adjustable, variable mechanism of the present invention which includes crank 44, slide 42, and a program member which determines the position of the slide on the crank. This program member is generally indicated by the reference numeral 50 and is best seen in FIGS. 3–5. It comprises an open frame 52 having two rows of bolts 54 passing through the frame from one end to the other. A pair of flexible bands 56 of sheet metal or the like are clamped in spaced parallel relationship within frame 52 by clamping members carried by the bolts 54 and engaging the bands at a plurality of points. At each point, the clamping members comprise a rigid spacing pin 58 and a pair of bearing members 60 bearing on opposite sides of the bands. The spacing pins 58 are interposed between the bands 56. One end 58' of the pins is of reduced diameter (as shown at 59, FIG. 5) to receive the bands and terminates below the corresponding face 60' of the bearing member 60. The spaced bands 56 thus form a channel 62 having a configuration in accordance with the position of the bands at the plurality of clamping points. At each clamping point a pair of bolts 54 pass through the bearing members 60 and the spacer pin 58, so as to securely hold the bands 56 against any tendency to rotate, and the bearing members 60 are fixed in position on the bolts 54 by nuts 64 and 65. The surfaces of the bearing members 60 in contact with the bands are rounded so as to provide a better contact with the bands in different configurations of the bands 56. The bolts are fixed to the frame 52 by means of nuts 66.

The disposition of the spaced bands 56 thus determines the program controlling the above mechanism. This disposition of the bands may be changed so as to provide a new program, by loosening nuts 64 and 65 on the bolts 54, locating the nuts (e.g. 65) on one side of the bands in accordance with the new programs, and then tightening the other nuts 64 on the other side of the bands so as to fix the bands and the bearing members 60 in the new program position.

Slide 42, in the form of a rectangular sleeve, carries a roller 70 (FIG. 6) movable within the channel 62 formed by the spaced bands 56. Roller 70 thus follows the disposition of the bands 56, and as it moves within the channel 62 formed by the bands, it displaces slide 42 along crank 44 in accordance with the configuration of the channel, increasing or decreasing the distance between the right end of the link 40 and the vertical axle 46 connected to cam 22 which displaces the table 12 and grinder 2. Ball way bearings 72 (FIG. 6) are provided within the slide to facilitate its movement along crank 44. The connection of slide 42 to link 40 is by means of a bearing 75, mounted on pin 74, carried by the slide and journalled on the end of the link. The opposite end of link 40 is journalled on one of a plurality of pins 76 carried by worm wheel segment 38. Thus, while the worm wheel segment 38 will be displaced in a fixed regular manner by motor 32 and speed reducer 34, the displacement of link 40 may be preset by applying its left end to a selected one of pins 76 carried by the worm wheel segment.

The operation of the machine will be apparent from the foregoing description. Motor 32, through speed reducer 34, worm 36, worm wheel segment 38 and vertical axle 26, causes table 24 and the lens blank 4 to rotate in the direction of arrows b—b during each stroke of a machine operation. The segment 38, through link 40, also reciprocates slide 42 and crank 44. As the slide 42 is moved, its roller 70 rides in channel 62 formed by the spaced bands 56 in the program member 50, and therefore the position of the slide on the crank will vary as determined by the configuration of the channel. The displacement of crank 44 resulting by a given angular motion of segment 38 will thus vary according to the location of slide 42 on crank 44 in any particular instant. This displacement of crank 44 is transmitted through vertical axle 46 to cam 22, which will displace table 12 in the direction of arrows a—a. The displacement of table 12 and of the grinder 2 carried thereby will thus be in accordance with the configuration of the channel 62 in program member 50.

A separate program is provided for each different part to be produced. When a new part is to be produced, a new program member may be substituted, or the program member may be changed to conform to the new part. In the illustrated program member, this is done by adjusting nuts 64 and 65 as described above.

The foregoing describes what occurs during each stroke of a machine operation. Usually a complete machining operation involves a plurality of strokes. As one stroke is completed, feeding knob 16 is moved so as to advance the grinder 2 a slight distance toward the lens blank 4, and the machine is operated for the second stroke. Subsequent strokes are performed in the same manner, feeding the grinder 2 a slight distance towards the lens blank 4 between each stroke, until the grinding of the lens is completed.

It will be appreciated that the novel mechanism described could be used for controlling the displacement of the lens blank 4 instead of, or in addition to, the grinder 2, and that both displacements could be angular or linear. Also, the mechanism could be used in other machines. Program members having fixed (i.e., unchangeable) guide surfaces could be used, there being one formed with a special guide surface for each part to be produced. Further, if more than one of the above described mechanisms is included in a mechanical device, with each mechanism controlled by its own program member, there would be provided a much larger number of variations in the functions which may be generated, and more than two displacements can be controlled, as for the production of more complicated shapes. It will of course also be appreciated that additional mechanical and servo-mechanical elements could be included, such as links, cams, gear trains, selsyns, etc., operationally connected to crank 44 and/or slide 42. Other variations and other mechanical analogue computer applications of the invention will also be apparent.

What is claimed is:

1. A control mechanism for coupling together two moving elements for controlling the relative movement of one with respect to the other, the latter being connected to a drive, characterized in that the control mechanism includes a crank to be coupled to one of said elements, said crank being pivotable about a fixed pivot point, a slide slidable along the crank, a link to be coupled to the other of said elements and pivotably connected to the slide at a pivot point overlying said crank, and a changeable program member having a guide surface of a configuration in accordance with the relative movement desired, said slide including a follower that moves along said guide surface during the movement of said link and displaces the slide along the crank to continuously vary the effective length of the crank in accordance with the configuration of said guide surface.

2. A mechanism according to claim 1, wherein said program member includes a pair of spaced flexible bands defining between them the said guide surface, said program member further including adjusting elements engageable at spaced points on said bands for changing the configuration of the guide surface.

3. A machine tool comprising the combination with the mechanism defined in claim 1 of a tool holder and a workpiece holder, at least one of said holders being displaceable in respect to the other and including a displacing device therefor, said mechanism being connected between said one holder and its displacing device.

4. A machine tool according to claim 3, wherein said one holder is carried by a table which is displaced by its displacing device through said mechanism.

5. A machine tool according to claim 4, wherein said table is displaced by a cam member which is rotated by the crank of said mechanism.

6. A machine tool according to claim 4, wherein the other of said holders is carried by a second table coupled so as to be directly displaceable by said displacing device without being controlled by said mechanism.

7. A machine tool according to claim 6, wherein said displacing device includes a worm wheel segment mounted for oscillatory movement and a drive for oscillating same, said second table being connected to the worm wheel segment to oscillate therewith, the worm wheel segment including a link connected to the slide of said mechanism.

References Cited

UNITED STATES PATENTS

| | | |
|---|---|---|
| 1,555,254 | 9/1925 | Proctor. |
| 1,845,172 | 2/1932 | Morey et al. _____ 51—46 |
| 2,085,016 | 6/1937 | Ferguson _____ 51—46 |
| 2,320,672 | 6/1943 | Stein _____ 51—46 |
| 2,506,947 | 5/1950 | Walker. |

FOREIGN PATENTS

| | | |
|---|---|---|
| 392,646 | 3/1924 | Germany. |

OTHELL M. SIMPSON, Primary Examiner

U.S. Cl. X.R.

51—50; 74—568